United States Patent [19]

Curci

[11] Patent Number: 4,585,392

[45] Date of Patent: Apr. 29, 1986

[54] BLADED ROTOR SYSTEM AND PITCH CONTROLS THEREFOR

[76] Inventor: Alfred Curci, 183 London Dr., Hamden, Conn. 06517

[21] Appl. No.: 561,926

[22] Filed: Dec. 15, 1983

[51] Int. Cl.$^4$ .............................................. B64C 27/74
[52] U.S. Cl. ..................... 416/114; 416/99; 416/24
[58] Field of Search ............... 416/227 A, 99, 115, 416/114, 23, 24

[56] References Cited

U.S. PATENT DOCUMENTS

| | | | |
|---|---|---|---|
| 1,040,136 | 10/1912 | Brown | 416/99 X |
| 1,657,119 | 1/1928 | Funck | 416/227 A X |
| 1,880,550 | 10/1932 | Wander | 416/99 X |
| 2,159,382 | 5/1939 | John | 416/98 |
| 2,549,407 | 4/1951 | Apostolescu | 416/115 |
| 2,556,710 | 6/1951 | Stalker | 416/114 X |
| 2,648,390 | 8/1953 | DeLagabbe | 416/24 |
| 2,755,866 | 7/1956 | Apostolescu | 416/115 |
| 3,640,488 | 2/1972 | Florschutz | 416/203 X |

FOREIGN PATENT DOCUMENTS

| | | | |
|---|---|---|---|
| 1960389 | 6/1971 | Fed. Rep. of Germany | 416/114 |
| 988584 | 8/1951 | France | 416/23 |

Primary Examiner—Everette A. Powell, Jr.

[57] ABSTRACT

A rotor system for a helicopter having a power shaft carrying at least one pair of diametrically opposite frames for rocking motion about an axis radially of said shaft. Sets of lift blades carried by the frames, respectively, for rocking motion about radial axes. A first pitch control means for rocking the frames and blades sets periodically. A second control means for rocking the blade sets simultaneously and equally relative to the frames. A third control means, including servomechanisms, for independently rocking the individual blades of said sets in different directions and extents relative to each other.

12 Claims, 3 Drawing Figures

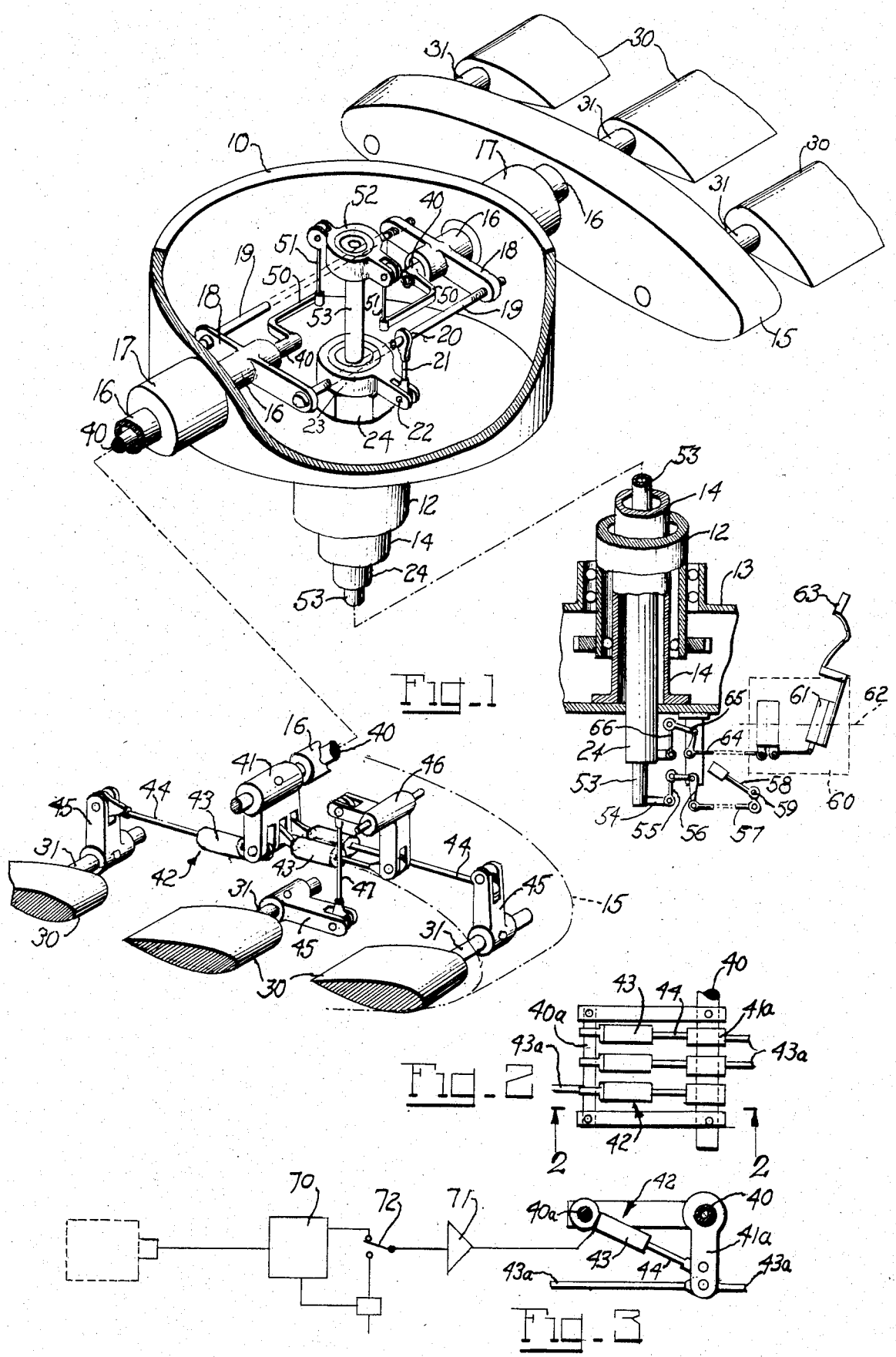

BLADED ROTOR SYSTEM AND PITCH CONTROLS THEREFOR

The present invention relates broadly to bladed fans and propeller structures. Specifically it relates to a main rotor system for a helicopter and consists of certain novel features in the construction, arrangement and combinations of the rotor lift elements to provide greater aerodynamic efficiency, improved control means, and relatively greater lift and forward speed for the craft.

Rotor systems for operational helicopters may have any number of lift blades which, unlike the present invention, are attached directly, in one way or another, to the rotor hub for pitch change motion. This form of construction greatly increases the mechanical complexity of the rotor hub. Additionally, rotor designers have been severely restricted in the choice of blade section. Generally, the profile is chosen by unavoidable compromise in which desirable aerodynamic qualities are sacrificed for a substantially stable center of pressure. Thus, in most operational helicopters the symmetrical section is used despite its relatively lower stalling angle, low range of lift coefficients and objectionable operating noise and vibrations. Further, this section requires a high degree of chordwise balance which is obtained only with the addition of excessive parasite weight.

One object of this invention is that a rotor system constructed and arranged in accordance with the principles of the invention, broadly provides superior flight performance and serves in large measure to avoid the above-recited limitations and disadvantages of prior rotor systems.

A specific object of the invention is to provide at least one pair of diametrically opposite frames carried by the rotor shaft for controllable rocking motion about an axis radially of said shaft.

Another object of the invention is that the above-mentioned frames are adapted, respectively, for carrying a plurality or set of lift blades for controllable rocking motion about their respective radial axes.

Another object of the invention is to provide a rotor system of the above-designated construction wherein the respective rocking axes of the blades and frames are so arranged and judiciously located relative to each other and with respect to a center of gravity point as to ensure perfect equilibrium of mass about the rocking axis of the frames.

A further object of this invention is to provide a first pitch control mechanism for rocking the blade sets and their frames in unison about their respective pitch change axes, whereby partial rocking motion of the latter is translated into partial rocking motion of the blade sets in the same direction, with the pitch increments thereof being vectorially additive.

Still another object of the invention is to provide a second pitch mechanism for rocking the blades in unison and the blade sets in opposite directions, respectively.

Another object of the invention is to provide a third pitch control means comprising servomotors which are operatively interposed in the abovementioned second pitch mechanism, and are selectively operable independently of the latter for adjustably rocking the individual blades of each given set in different directions and extents within a given range for obtaining optimum aerodynamic effectiveness therebetween.

A further advantage of the rotor system, arranged and constructed as above designated, allows a practical and successful employment of many different blade sections which are wide departures from the limitations of currently used sections. Additionally, it makes possible the use of many different combinations of blades in a given set, with the blades thereof differing from each other in weight, size, and profile section. However, for obvious stability requirements, the blades mounted in the same relative positions on their respective frames, i.e. blades whose rocking axes are substantially coaxial, will of course be identical in all physical respects, and these complementary blades will be adjustably rocked in unison for pitch increments of equal value on operating the above mentioned servomotors.

Other objects and advantages of the present invention will be apparent from the specification and claims and from the accompanying drawings, in which:

FIG. 1 is a perspective view of the rotor system constructed in accordance with the invention and shown partly in section and partly broken away, with certain control elements illustrated diagrammatically.

FIG. 2 is a modification showing another arrangement of the servomechanisms for adjusting the relative pitch of the adjacent blades of a set.

FIG. 3 is a view taken along line 2—2 of FIG. 2 and, in simple diagram form, also includes a control circuit for the servomotors.

In FIG. 1, the rotor system shown is constructed in accordance with the principles of the invention and adaptable to helicopters of various configurations. It will be appropriately supported on a helicopter fuselage (not shown) having a suitable powerplant for the power drive of the rotor.

As shown, a rotor hub 10 is carried on power shaft 12 which extends from and is suitably journalled in gearbox 3 for rotation about the axis of fixed standpipe or housing 14, which latter is suitably fixed with one end on the lower wall of gearbox 13.

At least one pair of diametrically opposite frames 15 are carried by the shaft 12 for rocking motion about a main axis diametrically of the shaft 12. Hollow or tubular shafts 16 are suitably mounted with one end on the inboard ends of the frames 15, respectively, substantially at a point intermediate the transverse ends and adjacent the top surface of the latter. The free ends of shafts 16 are journalled in the diametrically opposite sockets 17 of hub 10 and project into the latter where they are provided with integral crossarms 18 which are yoked or rigidly connected by a pair of similar tie-rods 19 so that the frames 15 will rock in unison about a main axis diametric of shaft 12.

The tie-rods 19 are provided with threaded ends adapted for lengthening or shortening the rods to provide adjustable tensioning means for releiving centrifugal forces generated by the rotating rotor assembly. Intermediate its ends, one rod 19 is pivoted at 20 to a link 21 whose opposite end is pivoted at 22 to integral arm of ring member 23. The latter is fixed against axial displacement but has the capacity for relative rotation on the upper end of the nonrotating vertically operating push-pull control tube 24, which latter passes through the before-mentioned standpipe 14. The lower end of tube 24 projects below gearbox 13 and is operatively connected to any known suitable pitch-actuating device, such as is shown at 60, for imparting periodic axial motion to tube 24 and hence rocking frames 15 in unison in a manner which will be described hereinafter.

The frames 15 are adapted for carrying sets of lift blades, respectively, for rocking about axes substantially parallel to the main pivot axis of the frames. As shown here, three lift blades indicated at 30 which comprise a set are individually pivotally supported radially from each frame 15. Suitably fixed to the respective root ends of the blades 30 are pivot stub shafts 31 which are independently journalled in the frames 15, respectively, in spaced-apart relation preferably lying substantially in a common plane extending chordwise of the frames and vertically spaced from a plane passing through the rocking axis of the latter.

It should be noted here that the rocking axes of the frames and blades 16 and 31, respectively, are judiciously located and calculated with respect to each other and to a center of gravity point as to provide perfect equilibrium of mass about the axis of frames 15.

The collective control mechanism for rocking the blades 30 in unison and the blade sets in opposite directions, respectively, comprises similar rock shafts 40 which coaxially extend through the respective tubular shafts 16 of the frames 15. The outer end of each shaft 40 which projects into frame 15 has an integral depending arm 41. Operatively connected between the latter and each of the blades of the set are three similar servo units broadly designated 42 whose function will be described later. These servo units 42, which normally serve, for collective pitch control, as rigid or solid motion transmitting means between the arm 41 and blades 30, consist of actuators 43 pivotally connected to said arm 41 and actuating rods 44 extending from the former which are operatively connected to the free ends of the pitch-change horns or levers 45, which latter are fixed with one end on the blade pivot shafts 31, respectively. It will be noted that the operating connections between the arm 41 and the central blade 30 of the set includes also an intermediary bellcrank 46 and a short vertical link 47 to ensure identical rocking motion of the three blades of the set.

The respective inboard ends of the before-referred to rock shafts 40 which project into the hub 10 are provided with integral offset arms 50 whose free ends are pivotally connected by similar links 51 to the oppositely extending projections of ring member 52. The latter is axially fixed but has the capacity for relative rotation on the upper end of a nonrotating push-pull control member 53 which is arranged for translation along the axis of the power shaft 12. The lower end of the push-pull member 53 extends below the gearbox 13 and it is provided with an integral arm 54 which, through link 55, bellcrank 56 and link 57, respectively, is operatively connected to a conventional collective pitch stick 58. As usual, the latter is pivotal about an axis 59 fixed on the airframe (not shown) and selectively operable for raising or lowering the push-pull member 53, which motion accordingly rocks the shafts 40 in opposite directions and, in turn, rocks all the blades 30 in unison and the blade sets in opposite directions, respectively. Thus, depending upon the directional displacement of stick 58, the blades 30, relative to the frames 15, receive either a simultaneous and equal pitch increase or decrease.

The servo units 42 above described, comprise actuators 43 which are selectively operable for adjusting the relative pitch of the adjacent blades 30 of the set independently of the collective pitch. Each actuator 43 may be any well-known device of the electric, hydraulic or pneumatic type, capable of imparting axial motion to the actuating rod 44 extending therefrom. Preferably, the actuators are reversible electric motors 43 having a suitable source of power and including controlling means for selectively energizing each of the motors 43 independently in one direction or the other accordingly to extend or retract the actuating rods 44 relative to the latter within predetermined limits, for adjustably rocking the individual blades 30 of a set in different directions and amounts, as desired, to obtain optimum flight performance therebetween.

As already explained in one of the objects of the invention, it is contemplated to experimentally test many different combinations of blades 30 for each set, with the blades thereof having various planforms and sections. During these tests the servomotors 43 preferably will be selectively controlled by suitable manual switch-activating means. Data derived from these tests may serve as a basis for the design of suitable programs which may be stored in the memory unit of any suitable well-known computer machine, such as shown at 70 in FIG. 3, for automatically controlling the servo-motors 43 in a prescribed desired manner.

FIG. 3 is an examplary showing in simple diagram form of a manual and automated means for controlling the servomotors 43. Included is any well-known computer machine 70, servo-amplifier 71, suitable manual switch means and all necessary electric and electronic circuits. Also included, but not shown, will be adjustably positionable normally closed limit switches arranged to de-energize the servo-motors 43 for limiting the travel of the servo actuating rods 44 within a desired range.

FIGS. 2 and 3 is a modification showing another arrangement of the servo units 42. In these figures, in place of the single depending arm 41 of FIG. 1, which is integral with rock shaft 40, three separate arms designated 41a are pivotally carried on each rock shaft 40. The latter, in this case, is provided with integral or yoked spaced parallel shaft portion 40a with the servo units 42 being operatively connected between the latter and the arms 41a, so that the servo actuating rods 44, on axial motion, react between arms 41a and shaft 40a. When de-energized, the servo units 42 lock arms 41a on rock shaft 40 so that they rock jointly with the latter for collective pitch control and, on selective operation of the servo units 42, arms 41a rock independently about the axis of shaft 40 to adjust the relative pitch of blades 30 in a manner already described. Also, in this arrangement, links 43a serve to interconnect the arms 41a with the blades 30, respectively.

Returning now to the cyclic pitch mechanism, as previously stated, the cyclic push-pull tube 24 is operatively connected, preferably, to the swashplate control unit 60 illustrated in FIG. 1. The latter substantially is similar to the control unit described in co-pending application Ser. No. 375,763 Dated May 6, 1982 for Rotary Wing Aircraft and therefore requires no detailed description, other than to mention that it includes a universally tiltable swashplate 61 mounted on and rotating with an axially fixed shaft 62. A manual stick 63 is operatively connected with the swashplate 61 and operable for shifting the latter into any one of its universal positions. Motion transmitting means comprising link 64, bellcrank 65 and link 66, respectively, operatively connect the swashplate 61 with the cyclic control tube 24.

In operation, the rotating swashplate, in any one of its tilted positions, imparts a periodic axial motion to the control tube 24, the phase of which is the phase of cyclic feathering. This motion of tube 24 rocks the frames 15 in unison and, due to the kinematics of the before-described operating connections between the blades 30 and the collective pitch stick 58, a partial rocking motion of the frames 15 is translated into a partial rocking motion of the blade sets in the same pitch-change direction, with the pitch increments of the frames and blade sets being vectorially additive, respectively.

What is claimed is:

1. In a rotor system for a helicopter, the combination of a power shaft, at least one pair of diametrically opposite frames carried by said shaft for rocking motion about a main axis diametrically of said shaft, sets of lift blades carried by said frames, respectively, for rocking about first axes substantially parallel to said main axis, a first manual member, an operating connection between said first member and said frames, and including a swashplate for rocking said frames in the same direction on operation of said first member, a second manual member, and another operating connection between said second member and said blades for rocking said blades in unison and said blade sets in opposite directions, respectively, on operating said second member.

2. The combination in a rotor system for a helicopter as in claim 1, in which said other operating connection includes a plurality of servo units, each providing a reversible motor operatively connected with a blade and operative to rock the latter independently of said second member, and control means for each motor, including a power source and being operable to connect said power source with said motor to operate the latter.

3. The combination in a rotor system for a helicopter as in claim 2, in which said motors that are operatively connected with blades whose rocking axes are substantially coaxial are operative to rock said blades equal amounts in opposite directions.

4. The combination in a rotor system for a helicopter as in claim 1, in which said main axis consists of tubular shafts mounted with one end on said frames, respectively, yoke members interconnecting the free ends of said shafts, with said frames having joint movability about said axis.

5. The combination in a rotor system for a helicopter as in claim 1, in which each said frame is airfoil shaped, and said blades are mounted thereon with their said respective axes spaced apart from each other substantially in a plane extending chordwise of said frame.

6. The combination in a rotor system for a helicopter as in claim 5, in which said plane is vertically spaced from and parallel to a plane extending through said main axis.

7. The combination in a rotor system for a helicopter as in claim 1, in which said main axis and said first axes, respectively, are positionally located relative to each other and so calculated with respect to a center of gravity point as to provide equilibrium of mass about said main axis.

8. The combination in a rotor system for a helicopter as in claim 1, in which said blades are of different configuration relative to each other and said blade sets are identical, respectively.

9. The combination in a rotor system for a helicopter as in claim 1, in which said second manual member is a stick pivotal about a fixed axis, and said other operating connection provides rock shafts extending coaxially through said tubular shafts, and means including a plurality of said servo units operably connecting said rock shafts with said blades, respectively, including an operating member mounted for motion axially of said power shaft, and means connecting one end of said member with said rock shafts for rocking the latter oppositely on motion of said member, and includng link means operably coupling the other end of said member with said stick for rocking said blades in unison and said blade sets in opposite directions, respectively, on rocking said stick in opposite directions.

10. The combination in a rotor system for a helicopter as in claim 2, in which each said reversible motor has an operating rod projecting therefrom, with said control means including a switching device having two conditions and being operable for selectively connecting said source of power with each said motor, accordingly to move each said rod selectively in one direction or the other relative to its motor for adjusting the pitch setting of said blades differentially with respect to each other and independently of said stick motion.

11. The combination in a rotor system for a helicopter as in claim 9, in which each said servomotor unit, in de-energized condition, normally provides a rigid operative connection between said rock shafts and each said blade for positive transmission of motion therebetween on motion of said stick.

12. The combination in a rotor system for a helicopter as in claim 1, in which said first manual member is operably connected to said swashplate, and said operating connection further provides a vertically operating member mounted for axial motion along said power shaft, and operatively coupled at its respective ends to said yoked tubular shafts and to said swashplate for imparting periodic rocking motion to said frames on manipulation of said manual member, whereby, owing to the kinematics of said other operating connection, partial rocking motion of said frames is transmitted into partial rocking motion of said blades in the same pitch change direction, with said pitch increments being additive, respectively.

* * * * *